Patented Aug. 25, 1936

2,052,027

UNITED STATES PATENT OFFICE 2,052,027

BRANCHED CHAIN OCTYL SULPHATE

Benjamin R. Harris, Chicago, Ill.

No Drawing. Application July 25, 1935,
Serial No. 33,055

7 Claims. (Cl. 260—99.12)

My invention relates to new chemical substances. It relates more in particular to new and improved alkyl sulphates having advantages as interface modifying agents and the like in various industries.

The principal object of the invention is the provision of certain new chemical substances adapted for use as interface modifying agents.

More specific objects of the invention and features and details thereof will be apparent from the following description.

According to my present invention, I produce an improved chemical substance for use as interface modifying, frothing, wetting, detergent, foaming, and like purposes, in various industries in which such properties are utilized. My improved product is a sulphate of a branched chain octyl alcohol, more specifically an ethyl hexanol, wherein the sulphate group may have an ionizable hydrogen ion or may be neutralized by suitable organic or inorganic neutralizing media. The invention is illustrated by reference to an alkyl sulphate produced from a specific alcohol, namely 2-ethyl hexanol-1, a preferred product for accomplishing the objects of the invention and procuring the functions sought. The sulphate of 2-ethyl hexanol-1 and the soluble or colloidably dispersible salts thereof are of great advantage in the industries.

To 130 parts of 2-ethyl hexanol-1 which has previously been cooled to approximately minus 10° C. or temperatures varying five degrees more or less therefrom, 117 parts of chlorsulphonic acid are slowly added. During the addition of the chlorsulphonic acid, the reaction mixture is stirred continuously and conditions are controlled such that a temperature of approximately minus 10° C. is maintained. Those skilled in the art are familiar with various ways in which this temperature may be produced and maintained. One method is to introduce solid carbon dioxide directly into the reaction mixture in such amounts and at such time intervals that an approximately uniform temperature of minus 10° C. is maintained. During the reaction, which begins as soon as the first of the chlorsulphonic acid is added, suitable means is used for drawing off hydrochloric acid which is evolved. When the reaction has gone to completion, the resulting product is an acid sulphate of 2-ethyl hexanol-1. This product may be used as such, but for most purposes is preferably neutralized according to a suitable procedure, for example as illustrated below.

I may neutralize the acid alkyl sulphate by producing a salt which is either anhydrous or one which is in an aqueous medium. One example of neutralization in which the final product is substantially anhydrous is as follows:

To 100 parts of the acid alkyl sulphate, about 40 parts of monoethanolamine are slowly added with constant stirring. During neutralization, the temperature is kept down preferably below zero degrees C., or as low as minus 5° C. Lower temperatures may be employed, but they are not essential. The 2-ethyl hexanol-1 sulphate neutralized in this manner is a light tan colored paste.

As an example of neutralization in which an aqueous solution of a salt is obtained, the following is illustrative: To 100 parts of alkyl sulphate, 40 parts of crushed ice are slowly added with constant stirring, the temperature of the whole mass meanwhile being kept at approximately zero degrees C. When all of the crushed ice has been introduced and the product has become hydrated, 38 parts of sodium hydroxide dissolved in 100 parts of water and cooled to about zero degrees C. are slowly added. It should be noted that 38 parts of sodium hydroxide is slightly in excess of the equivalent amount required to entirely neutralize the sulphate radical. During the neutralization step, the temperature of the mixture is kept at about zero degrees C., the mass being stirred thoroughly during the entire neutralization. The product resulting from the neutralization with sodium hydroxide in this manner is approximately a 50% aqueous solution of the sodium octyl sulphate. This product can be used in the form in which it is obtained with great advantage in many industries where interface modifying and similar functions are desired.

The invention is in no sense limited to the use of any particular base for neutralizing the acid alkyl sulphate. The following examples illustrate a number of neutralized products, all of which can be used to advantage in various industries.

1. The triethanolamine salt of the sulphuric acid ester of 2-ethyl hexanol-1,

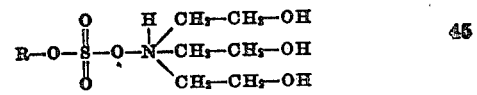

This substance is liquid at room temperature.

2. The ethanolamine salt of the sulphuric acid ester of 2-ethyl hexanol-1,

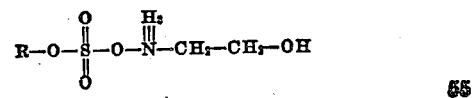

which is a semi-viscous paste at room temperature.

3. The triamylamine salt of the sulphuric acid ester of 2-ethyl hexanol-1,

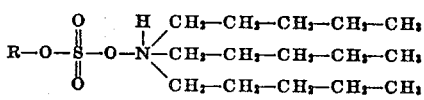

which is an oily liquid at room temperature.

4. The lead salt of the sulphuric acid ester of 2-ethyl hexanol-1,

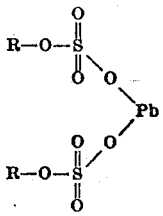

which is a cream colored crystalline solid.

5. The copper salt of the sulphuric acid ester of 2-ethyl hexanol-1,

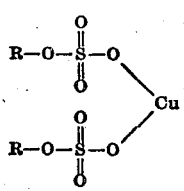

which is a cream colored crystalline solid.

6. The barium salt of the sulphuric acid ester of 2-ethyl hexanol-1,

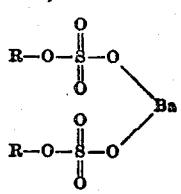

which is a cream colored crystalline solid.

7. The sodium salt of the sulphuric acid ester of 2-ethyl hexanol-1,

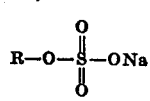

which is a cream colored crystalline solid.

8. The ammonium salt of the sulphuric acid ester of 2-ethyl hexanol-1,

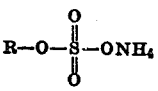

which is a cream colored crystalline solid.

In all of the above examples, R represents the radical of 2-ethyl hexanol-1.

In all of these examples, neutralization has been carried on in general according to the examples given hereinabove, the products being produced either in the form of aqueous pastes or solutions, or in the form of anhydrous materials, depending upon the procedure used and the purpose for which the products are to be employed.

Of the above mentioned salts, that given in Example 3, namely the triamylamine salt, is an oil-like substance not readily miscible with water, but still having many advantages in certain types of industries and for various purposes. The remaining substances given in the examples are very soluble in aqueous media and in varying proportions produce foaming and frothing when shaken in a watery medium. Furthermore, these substances have the property of acting as interface modifiers in many types of emulsions and the like when employed in suitable proportions. As an example of the functioning of these materials, if a relatively small amount thereof be introduced into oleomargarine formed in the usual manner from milk and oleaginous materials, the margarine will not spatter violently when heated in an open pan as contrasted with the violent spattering of untreated margarine under the same test conditions. I wish to call attention to the fact, however, that many of these substances have sufficient odor and the like as to be more or less objectionable as ingredients of margarine. The criterion of reducing spattering in margarine, however, I consider as an indication of an interface modifying action, the character of which is relatively easily determined by the margarine test.

It must not be assumed that the invention is limited to any single method for sulphating the alcohol. For example, the sulphate may be produced by employing sulphuric acid directly at varying temperatures and then neutralizing the resulting acid sulphate in any desired manner. Similarly, $SO_3$ may be added to the alcohol directly or in a solvent such as pyridine, chloroform, ethylene dichloride, acetic anhydride, and the like, and the product thereafter neutralized. Similarly, the sulphating step may be accomplished by employing mixtures of chlorsulphonic acid and $SO_3$, which may be added directly to the anhydrous alcohol, or to the alcohol which has first been dissolved in a solvent. A mixture of sulphuric acid and $SO_2$ can also be used with or without sulphates as may be desired at varying temperatures. Sulphonyl chloride or other reagents may also be used for the purpose of introducing the sulphate radical. The final acid sulphate product resulting from the reactions with any of the aforementioned reagents can be neutralized with suitable neutralizing media of either inorganic or organic character in any desired or conventional manner.

The neutralizing agents given by way of example are neither limiting nor exhaustive. Any suitable ion of an inorganic character such as potassium, calcium or the like may be employed. Other organic neutralizing agents are methyl amine, ethyl amine, propyl amine, butyl amine, hydroxy propyl amine, benzyl amine, and other basic amines. Still other neutralizing agents which may be used are pyridine, quinoline, quinaldine, aniline, dimethyl aniline, and the like.

In the examples given, the octyl alcohol is in the form of 2-ethyl hexanol-1. According to the main features of the invention, the ethyl group may be in the 2, 3, 4, or the 5 position. In the 2 position, however, the resulting products are particularly advantageous for the general purpose described.

Although I have described compounds hereinabove wherein the branched chain octyl alcohol is an ethyl hexanol, it is evident that my invention is not so limited. Other branched chain octyl alcohols may be sulphated wherein the positions of the branch chain and alcoholic hydroxy group may be varied with respect to each other. However, in all cases, the alcohol which is sulphated is an octyl alcohol, that is, one containing eight carbon atoms.

What I claim as new and desire to protect by Letters Patent of the United States is:

1. A sulphuric acid ester of a branched chain octyl alcohol.
2. A sulphuric acid ester of a branched chain octyl alcohol wherein the sulphate group is neutralized with an alkaline reacting substance.
3. An alkyl sulphate having the formula

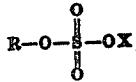

wherein "R" is an ethyl hexyl radical and "X" is an amine radical.
4. An alkyl sulphate having the formula

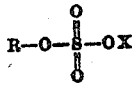

wherein "R" is an ethyl hexyl radical and "X" is a cation.
5. A sulphuric acid ester of 2-ethyl hexanol-1.
6. An alkyl sulphate having the formula

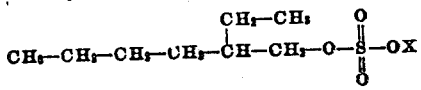

wherein "X" is a cation.
7. An alkyl sulphate having the formula

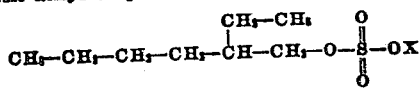

wherein "X" is an amine radical.

BENJAMIN R. HARRIS.